United States Patent
Kogure et al.

(10) Patent No.: US 10,479,433 B2
(45) Date of Patent: Nov. 19, 2019

(54) FOUR WHEEL DRIVE

(71) Applicants: Masako Kogure, Tokyo (JP); Kapil Gupta, Delhi (IN)

(72) Inventors: Masako Kogure, Tokyo (JP); Kapil Gupta, Delhi (IN)

(73) Assignee: Minjal, Inc., New York, NY (US)

( * ) Notice: Subject to any disclaimer, the term of this patent is extended or adjusted under 35 U.S.C. 154(b) by 0 days.

(21) Appl. No.: 15/412,029

(22) Filed: Jan. 22, 2017

(65) Prior Publication Data

US 2018/0312210 A1    Nov. 1, 2018

(51) Int. Cl.
*B62K 9/00*     (2006.01)
*B62K 5/003*    (2013.01)

(52) U.S. Cl.
CPC ...................... *B62K 9/00* (2013.01)

(58) Field of Classification Search
CPC ...... B62K 5/003; B62K 9/00; B60B 33/0005; B60B 33/0028; B60B 33/0039; B60B 33/0097
USPC ............................. 280/87.01, 87.021, 87.051
See application file for complete search history.

(56) References Cited

U.S. PATENT DOCUMENTS

| | | | | |
|---|---|---|---|---|
| 3,194,293 A * | 7/1965 | Kindley | .............. | B60B 33/0028 152/327 |
| 3,567,242 A * | 3/1971 | Miller | .................. | B62B 15/008 280/87.041 |
| 3,709,515 A * | 1/1973 | Kilcullen | ................ | B62B 5/082 280/87.051 |
| 4,244,592 A * | 1/1981 | Lohr | ........................ | B62K 9/00 280/1.165 |
| 4,261,588 A * | 4/1981 | Kassai | ..................... | B62K 9/00 280/272 |
| 5,394,589 A * | 3/1995 | Braeger | .............. | B60B 33/0028 16/44 |
| 6,231,056 B1 * | 5/2001 | Wu | .......................... | A47D 1/02 280/87.051 |
| 6,494,815 B1 * | 12/2002 | Welsh, Jr. | ............. | A47D 13/043 280/87.051 |
| 6,695,327 B1 * | 2/2004 | Maggiore | ............ | A47D 13/043 280/1.16 |
| 8,998,227 B1 * | 4/2015 | Chen | ..................... | A47D 13/102 280/38 |
| 2002/0175483 A1 * | 11/2002 | Glover | .................. | B62B 15/008 280/87.01 |

(Continued)

*Primary Examiner* — Frank B Vanaman
(74) *Attorney, Agent, or Firm* — Richard A. Castellano; DNL Zito Castellano

(57) ABSTRACT

A ride on toy vehicle comprising a vehicle body. The body having an upper surface that is molded in shape of a seat including a saddle having a laterally widened rear end portion and narrow front end portion. The upper surface of the body configured to vertically receive a detachable handle where the handle is projecting upwardly from the upper surface of the body when mounted in the upper surface of the body. The detachable handle is configured to form a grip for the rider. The body of the vehicle having a bottom surface configured to protrude outwardly from the body at each horizontal end of the bottom surface to act as a safety bumper. The bottom surface has independent holes at each of its four corners. A wheel assembly independently inserted in each independent hole at the bottom surface.

12 Claims, 10 Drawing Sheets

(56) References Cited

U.S. PATENT DOCUMENTS

2012/0211955 A1* 8/2012 Herlitz .................... B62K 9/00
                                                     280/33.998
2016/0121652 A1* 5/2016 Han ..................... B60B 33/028
                                                        16/35 R

* cited by examiner

FOUR WHEEL DRIVE

REFERENCES TO RELATED APPLICATION

This application claims the benefit of U.S. Provisional Patent Application No. 62/289,243 filed Jan. 30, 2016 under 35 U.S.C. § 119(e). The disclosure of which is hereby incorporated by reference herein in its entirety for all purposes.

FIELD OF INVENTION

The field of invention relates to a ride-on toy vehicle, and particularly to improvement in ergonomics and movement of the toy vehicle.

BACKGROUND OF THE INVENTION

For Children aged between 1-3 years, toy rides are available in the market for indoor and outdoor riding. Generally, these kinds of rides are in between a walker and a cycle with paddles. Currently available ride-on toys focus on attractive looks (for sales) or folding designs to save on logistics costs rather than focusing on ergonomics and play value of the toy as per a child's need. Currently available toy rides are generally built up with cumbersome attachments (straps/back rests) that sometimes make them difficult to use by a child without the help of an adult. Instead of joyfully riding a child usually sits idle on such rides. A need is felt for a ride-on toy which is ergonomically designed and best suited to a child's needs.

At the tender age of one (1) year, a child who has just learnt to walk and cannot paddle anything on its own. The thigh and calf muscles are not sufficiently developed to help the child apply enough pressure to a paddle. Particularly, kids at such an age have a tendency to start and stop suddenly. This tendency is facilitated by the special wheel design that has only one point of contact with the surface. The toy ride utilizes the body weight and balance of the child with the leg force direction to help quickly turn the direction of the toy ride at all speeds or while the toy is stationary.

A need is also felt for a smooth moving toy which is under full control of the child, harnesses every bit of energy and uses the body mass of the child in a way that riding the toy does not cause fatigue and provides a big play value over the ornamental value. Generally, the handles of the currently available toy rides turn/move for moving them in a desired direction. Coordinating the hand and leg movement is challenging for the child especially when the toy is stationery. Some go in a one direction only, which the child has to pick and lift. Additionally, there are many toy rides where an adult's push is required. In such rides, apart from adult's push, adult's help is also required to even put the child on the ride. Other than that, many toy rides have pushing rods attached to them. In such type of toy rides, an adult has to apply force to move the toy ride. In doing so, the child becomes dependent on an adult for enjoying the toy ride, and the play value of the toy ride is lost.

Furthermore, products currently available in the market do not provide an ergonomic combination of play value, stability, balance and protection from toppling over. Currently available products in the market hinder a free multi-directional movement of the toy vehicle without using any force or without stressing the child to push the vehicle and are not ergonomic. Many of such available toys are oversized and need a large space to maneuver (often scarce indoors) to move around. The oversize and weight of such toys is also not relative to the riders' body size and weight. Further, the wheels of such toys are normally attached in pairs with an axle between the wheels for support. This makes it fairly difficult for a child to turn the toy while riding. To turn the toy child has to stand up and then move the toy and again sit back to ride the toy vehicle. This cumbersome process is not child friendly. Moreover, many toys use generic castor wheels which are not specially designed according to a child's need (where each wheel is made of two parts touching the ground making it reasonably difficult for the toy vehicle to turn). The design of such toy vehicles combined with mechanical movements makes it quite cumbersome for a small child to fully enjoy the toy ride. Usually, it is seen that on such toy vehicles the child is sitting idle (taking rest) after one or two strokes. There is a need for a rider driven ride that will provide stability, balance and protection to the child riding such a ride.

The foregoing problems have been resolved by providing ergonomically designed present toy vehicle invention. In designing the present invention, emphasis have been kept on ergonomics design of the toy vehicle. A child's body mass and energy is channelized in such a way that every bit is utilized in the toy vehicle's movement. Each component of this toy vehicle has been designed to achieve the foregoing. Accordingly, the invention encompasses the following advantages in its design:

i) No push rods or adult support is needed other than the initial training.

ii) The height is optimal so that child can sit on the toy on its own anytime he wants which brings the toy under control of rider in the shortest time. To ride the toy vehicle, the child can climb it by just standing on one leg and crossing over the second leg seat to ride comfortably or the toy vehicle can also slide in between the legs of the child.

iii) Due to the low height of the toy, the feet of the child touches the ground as the child sits comfortably on the seat and legs are free for movement and support.

iv) No pedaling is required to move the toy vehicle. Pedaling is not possible at a tender age because a child's thigh and calf muscles are not fully developed. The movement in this toy vehicle is just like running or walking which the child at this age has just learnt.

v) Unlike currently available toy vehicles in the market where the child has to steer a handle by turning, the present invention is turned using the leg forces of the child making the 360° movements of the toy vehicle effortless.

vi) For the ergonomic design, the handle of the present invention is fixed. The handle provides the support needed by the rider of the toy vehicle. A handle is the first Touch point for the child in case to ride on a toy which he uses to support himself as he begins to sit on the seat. Of this first touch point the handle ends are the ones to be touched first which have been made spherical for a quick and easy grip.

vii) Seat Shape is narrow in middle and contoured in such a way that the thighs of the child can grip the seat instantly bringing the toy in full control even if the child takes off one of the hands.

viii) Loop at the back prevents the Rider from slipping back.

The foregoing ergonomic advantages of the present invention help in longer play with least fatigue. The time spent on the toy is more towards movement and enjoyment.

SUMMARY OF THE INVENTION

A toy vehicle comprising a vehicle body. The body having an upper surface that is molded in shape of a seat including a saddle having a laterally widened rear end portion and narrow front end portion. The upper surface of the body configured to vertically receive a detachable handle where the handle is projecting upwardly from the upper surface of the body when mounted in the upper surface of the body. The detachable handle is configured to form a grip for the rider. The body of the vehicle having a bottom surface configured to protrude outwardly from the body at each horizontal end of the bottom surface to act as a safety bumper. The bottom surface has independent holes at each of its four corners. A wheel assembly independently inserted in each independent hole at the bottom surface.

For further understanding of the advantages of the present invention, reference should be made to the following description taken in conjunction with the accompanying drawings.

BRIEF DESCRIPTION OF DRAWINGS

The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements.

DETAILED DESCRIPTION

Figure 1:
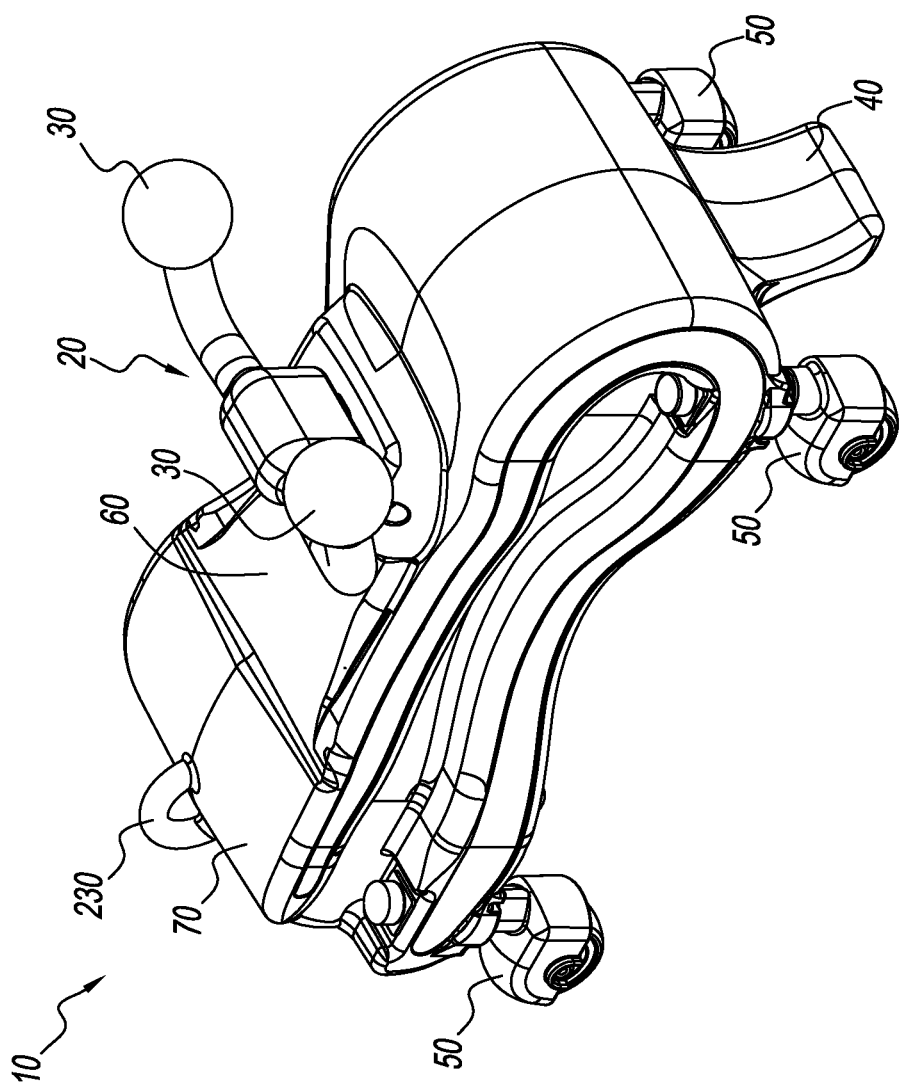
FIG. 1 is the front perspective view of the preferred embodiment of the toy vehicle.

The whole design of the toy vehicle is unique in its own manner, and when the design of every part of the toy vehicle is taken together produces a ride that is ergonomically designed and compact in size. Further, it provides more activity while being more stable, balanced and safe compared to the similar conventional products available in the market. The toy ride has been designed to utilize the body weight and its force efficiently that riding it for a long time does not cause any fatigue to the child. Physics principles of flywheel, friction, distribution of force have been utilized to create an efficient, smooth moving and safe toy. More than the ornamental looks the ease for a child to use the toy has been emphasized. FIG. 1 shows the preferred embodiment toy vehicle 10 of the present invention. Generally, the toy vehicle is made from a single mold plastic to provide sturdiness and durability. However, in other embodiments, it can be made by joining multiple parts. The upper surface 70 of the toy vehicle 10 has a design that has a seat 60, which is molded in shape of a saddle. The saddle is designed in a manner where the rear end portion of the saddle is laterally widened and the front end portion of the saddle is narrower than the rear end. This shape helps the rider to have comfortable thigh grip on the toy vehicle. As an example, the seat on the upper surface is shaped like the seat of a motorcycle where the rider sits comfortably. A handle 20 is also inserted on the upper surface of the toy vehicle 10 which helps the rider to hold it for balance while riding the toy vehicle. Additionally, the height of the seat 60 is kept near the knee level of the rider to make it an easy self-ride on and self-ride off toy vehicle. The toy vehicle can be made of a different height that is different than the preferred height in the preferred embodiment of the toy vehicle. Loop 230 at the rear end of the seat prevents the rider from slipping back.

The handle 20 and seat 60 of the toy vehicle are positioned in such a way so as to keep the Rider's body mass (body weight) in the middle of the Toy. The concentration of the center of mass (body weight of child) helps the toy vehicle 10 to spin 360° with ease. Rider's body mass in the center of ride-on toy vehicle helps a 360° spin movement with the rider's body as axis. This makes turning easy, efficient and easy maneuvering in narrow spaces at a lowest turning radius. Center of Mass/Center of Gravity not only helps easy turning but it also provides the lowest turning radius. The handle 20 has holding means 30 at its ends so as the rider can hold the handle while riding it. Generally, in the preferred embodiment, the holding means 30 are small sphere, which helps small hands to attain a full grip without folding the fists completely around the holding means 30. In the preferred embodiment, the small sphere 30 is generally 2 inches in diameter. These spheres are the first touch point when a rider begins to mount the ride bringing it the position to sit easily.

The toy vehicle 10 has wheel assembly 50 fitted at four corners of the bottom surface of the toy vehicle 10. The wheels assembly 50 is positioned in such a way at each corner such that the Center Mass of the toy vehicle 10 is equidistant from all the four wheel assemblies. The equal weight distribution of the mass makes the toy stable and keeps it under the rider's control. To make the toy vehicle more stable and safe, a front end bumper 40 has been designed in the mold of the toy vehicle 10. The bumper (explained below) also prevents toppling over of the toy vehicle in case of the collision with any object while the child is riding the toy vehicle. The bumper is aligned with the body edges of the toy vehicle. The protruding bumper at the base of the toy vehicle is in alignment with the body edges of the toy vehicle. This bumper not only provides safety against collision but also reduce the ground clearance of the toy vehicle protecting the feet of the rider. Additionally, the also protect the wheels should a high object comes on the floor. A similar back end bumper 210 (shown in FIG. 2) has been designed in the mold of the toy vehicle.

An optimal weight and size of the toy vehicle 10 vis-à-vis riders body weight and size has been maintained so that it is not only stable while riding but the whole toy is also under easy control of the child and provide a good play value. Whereas with a heavy or an oversize toy the rider struggles to bring it under his control and it is difficult to maneuver around for a small kid specifically controlling the movements in narrow indoor spaces. Due to this size and optimal weight the child can also stand up and hold the toy with handle between legs. The body and handle material chosen have been intentionally kept hollow to keep the toy vehicle 10 light and strong. The material of the body of the toy ride is designed to achieve the optimal weight with respect to its size in terms of volume for the ride. This selection allows suitable balancing and thereby safety of the child. In the preferred embodiment, the chosen material is plastic. However, any other similar stable material known to one of ordinary skill in the art may be used to manufacture the toy vehicle.

Figure 1A:
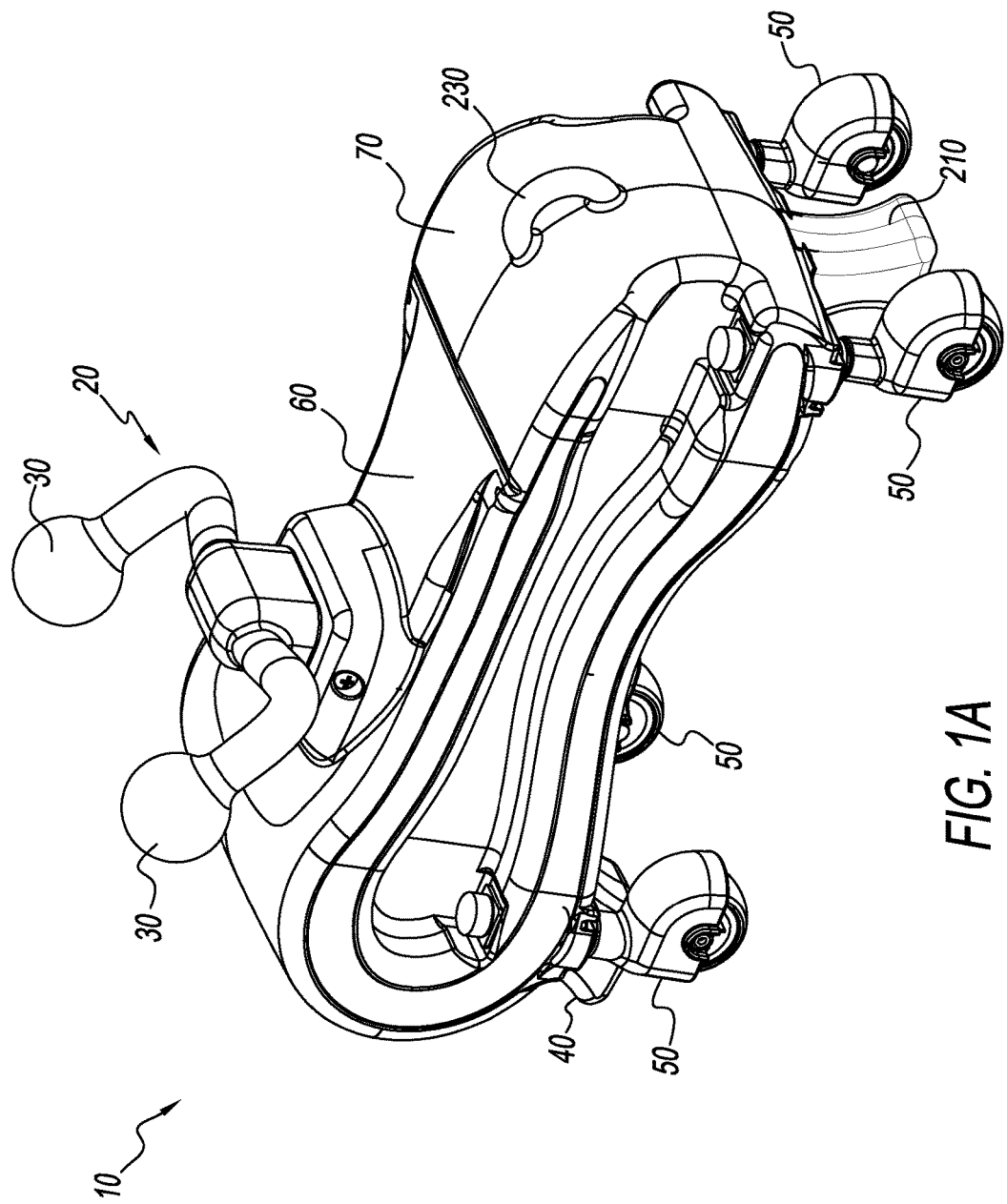
FIG. 1A rear perspective view of the preferred embodiment of the toy vehicle.

FIG. 1A is the rear perspective view of the preferred embodiment of the toy vehicle. As visible from this view, the seat 60 is in shape of a saddle. A back end bumper 210 is also included in the mold of the toy vehicle. Similar to front end bumper 40, the back end bumper 210 also provides stability to the toy vehicle. The back end bumper 210 also prevents any damage to the toy vehicle if it hits any object from the back. Additionally, it helps to prevent the toy vehicle from toppling over.

Figure 2:
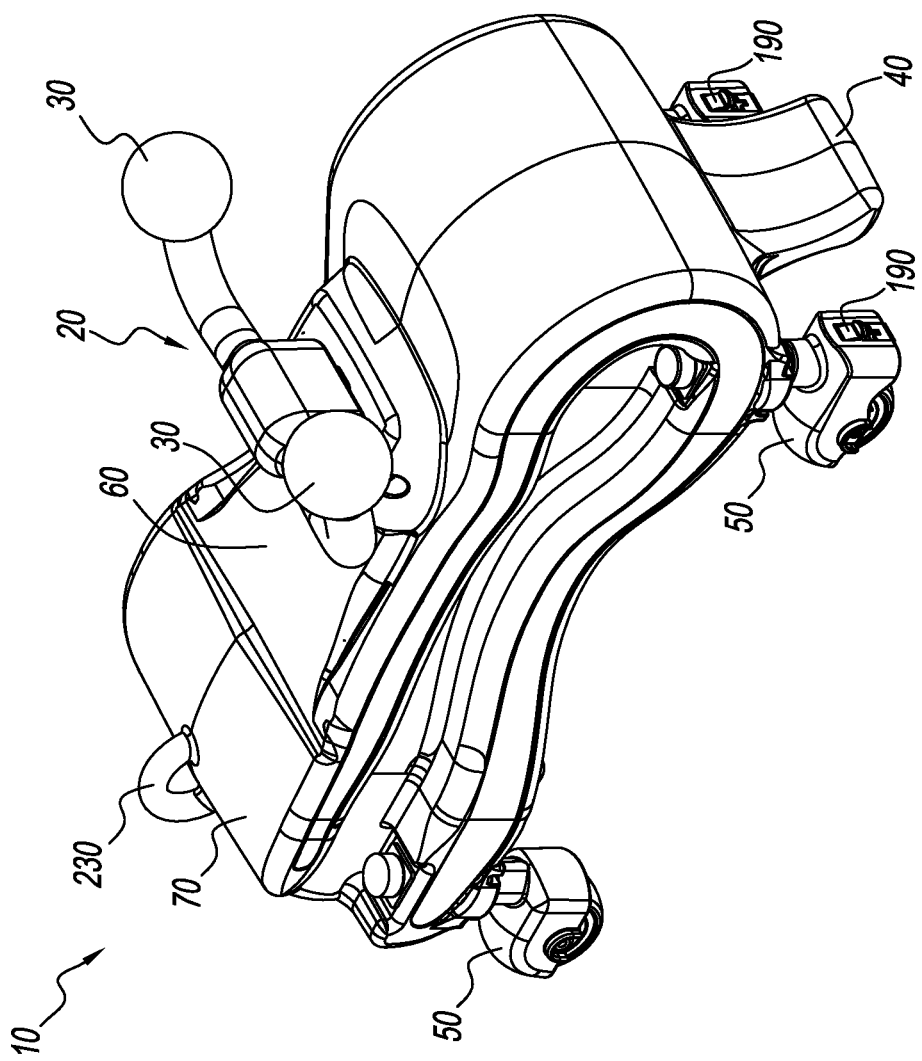
FIG. 2 is the front perspective view of another embodiment of the toy vehicle.

In another embodiment shown in FIG. 2, the front wheel assembly 50 of the toy vehicle has means 190 to control the speed of the toy vehicle. The function performed by means 190 is that of adjustably applied brakes. In one embodiment, the wheel assembly 50 is not fitted with any speed control means, which allows the toy vehicle 10 to freely move in any direction by the child. However, in another embodiment, a speed controlling means 190 can be added to the wheel assembly without defeating the purpose of the wheel assembly 50 and the toy vehicle. With speed controlling means 190, the toy can turn into a walking learner where the child pushes from the front by holding the handle bars while learning to walk without sitting on the toy vehicle. A button in the speed controlling means 190 can be moved up and down to control the speed of the toy vehicle. Setting the button in an upwards position slows down the wheel movement thereby slowing the toy vehicle. The setting of buttons in both the front wheel assembly may be in a same direction. This button is not a brake for the toy vehicle.

Figure 3A:
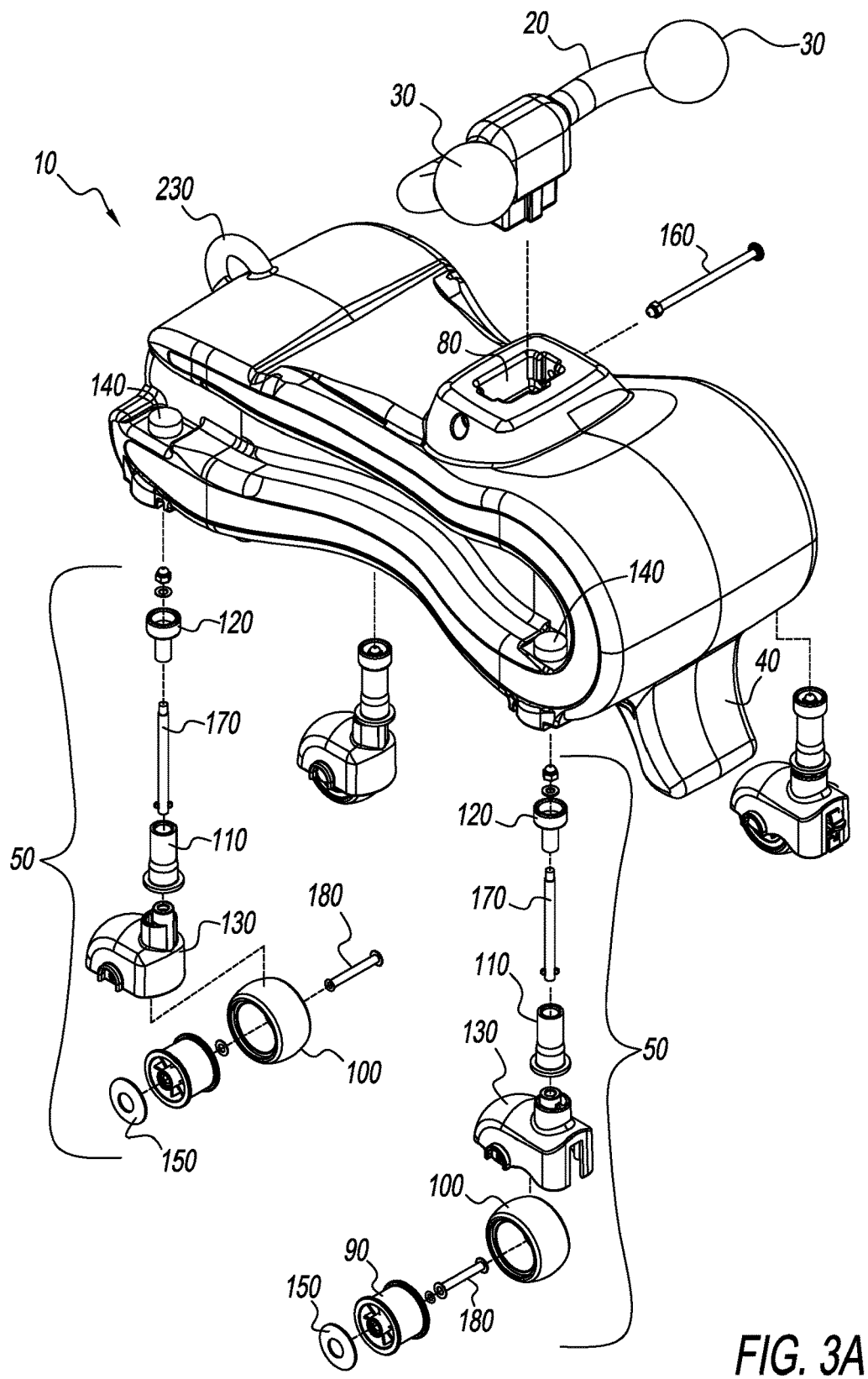
FIG. 3A is the exploded view of the preferred embodiment of the toy vehicle.
Figure 7:
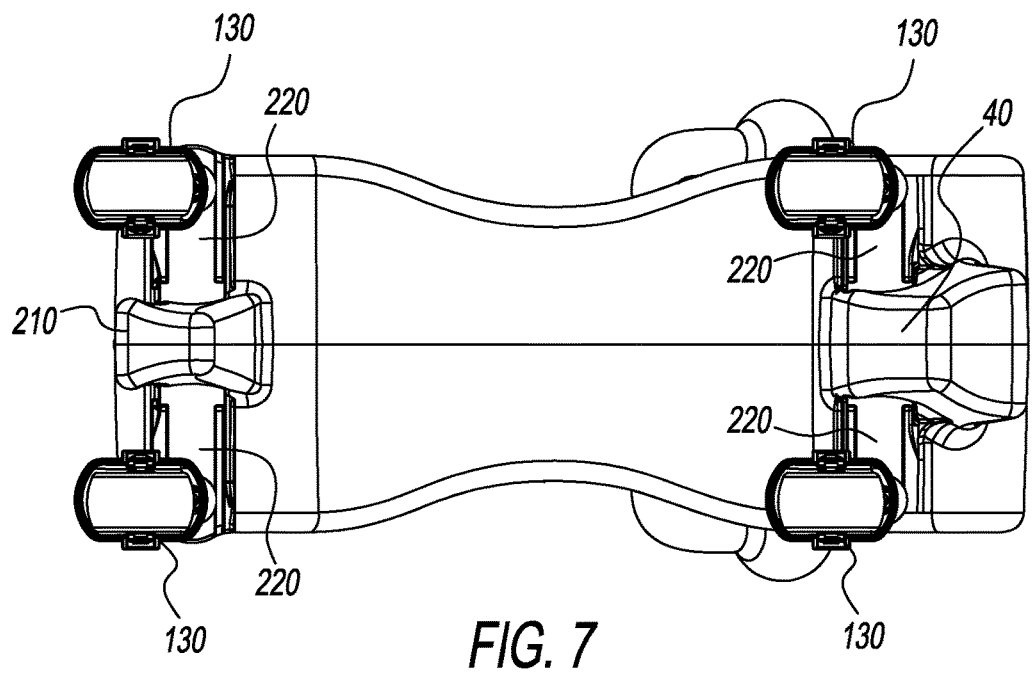
FIG. 7 is the top view of the bottom of the preferred embodiment of the toy vehicle.

FIG. 3 is the exploded view of an embodiment of the parts of the toy vehicle 10. The body frame of the toy vehicle 10 has been designed to include bumpers. A front end bumper 40 is located in the front side of the toy vehicle and back end bumper 210 (as shown in FIG. 1A and FIG. 7). If while riding forward the child comes across a high object on the surface, the bumpers will bump the object rather than the wheels or the feet of child. The back bumper 210 will do the same in case the child pulls back. The front end bumper 40 and the back end bumper 210 are aligned with the outer edges of the upper surface 70 of the toy vehicle 10. The alignment serves a purpose where if the toy vehicle collides with any object, the jerk is received by the toy on the whole body instead of just one corner that can make the toy unstable. These bumpers not only provide safety against collision but also reduce the ground clearance of the toy vehicle protecting the feet of the rider. Additionally, they also protect the wheels should a high object comes on the floor.

The upper surface 70 of the toy vehicle 10 is designed to have means 80 to vertically receive a handle 20 for the toy vehicle 10. The handle is inserted in the means 80 and is stabilized using a pin 160 inserted perpendicular to the handle. The pin 160 can be galvanized metal such as steel. The handle design of the ride is made in resonance with the shoulder width of a child. The design will give comfort to the child to hold the handle as the width of the handle will correspond to the shoulder width. The position of the handle on the upper surface 70 keeps the rider's body mass in middle. The ends 30 of the handle are also designed for a comfortable grip by the child rider of the toy ride. As previously mentioned in the description of FIG. 1, the ends 30 are generally sphere. The sphere shape has the advantage of bringing more surface area so that to gain a comfortable grip even if the fists of the rider are not completely closed. Otherwise, it will be tiring for the tender fingers to hold the handle tightly for a long time. This design greatly reduces the time to quickly ride on or ride off the toy vehicle. The rider places the fists on the ends 30 and feels the grip instantly. However, a person of ordinary skill in the art can think of another means to hold the handle while not defeating the purpose of the toy vehicle 10.

The handle 20 is specifically bent forward at a certain angle that supports the ergonomic design of the toy vehicle 10. The handle is fixed to the frame of the toy vehicle 10 at such a position so as to keep the child's body weight in the middle. The spheres 30 are at such a distance that the child has to sit with upright back, which eliminates the need of back support/back rest.

The toy ride turns by applying the leg force opposite to the desired direction of the movement. The preferred material for the handle 20 is also plastic; however, any other material may also be used to make the handle. The handle 20 is positioned in a forward angle, (generally in the range of 15 to 30 degree) up to a length that would be sufficient for an ordinary rider of the prescribed age to grip the handle from elbow to fist. The handle 20 resting near the lower abdomen is supported by the thick handle base in the middle of the handle 20 as the child leans forward pushing the toy with legs to take a leap. Even when sitting, the rider is in a very comfortable position. The base of the handle and the means 80 in the frame of the toy vehicle are designed to support the lower abdomen of the child. These are wide enough for comfort. In the preferred embodiment, the width is generally 8 inches. However, a person of ordinary skill in the art may be able to increase or decrease the width of 8 inches without defeating the purpose of the invention. This also ensures that the handle ends 30 are not at the arm's length but close to the child's body. Furthermore, these positions are shaped and positioned in a way that the elbows are close to or touch the abdomen. This makes the child to sit upright and give a feel like sitting on a small stool.

The moving wheel 50 comprises of a wheel 90 and a core 100 that completely covers the wheel along its circumference. The wheel 90 is generally made of plastic; however, other material can also be used. In the preferred embodiment, each wheel 90 is designed as a single round wheel. The width of the wheel 90 is specifically chosen so as it does not sink obstructing its free movement when the toy vehicle is driven on a common non-hard floor such as a small carpet. The wheel 90 is wholly covered by a core 100 along the wheel's circumference. Normally, in the existing toys that are sold in the market, the wheels are generally made flat. However, the core 100 of the toy vehicle has a unique and advantageous design. The core 100 is designed to be curved along with its cross-section. This unique design of the core 100 creates only one tangent touch point with floor on which the toy vehicle is being ridden. This unique design of the core 100 makes it easier to bring the toy in motion using significantly less initial force making it easy to turn the direction while in motion. In small and confined, places the child may stop and start the ride with ease. Starting again with a lot of force may be tiring for the rider. Whereas, in the present design with uniquely designed wheels, less force is required at the start. Care has been taken to keep the fastening mechanisms surface smooth by applying coatings and keeping the size optimal to keep the gap between the wheel and the axle as narrow as possible. This allows the wheel to get a fit support from axle.

The child riding the toy vehicle suddenly starts and stops the toy vehicle, so due to the design of the core 100 the toy vehicle becomes very smooth for sudden start and stop. The core 100 is curved along its cross-section which provides less area of contact of the core with the surface on which the toy vehicle is ridden. The core 100 is preferably made of soft polymer to have a grip on the floor. This allows the core to be hard and smooth and simultaneously to run on a plain surface. However, the core 100 can be made of other materials also that are known to persons of ordinary skill in the art. The wheel assembly includes a lower bush 110, an upper bush 120, a wheel cover 130, a cap 140, covering disc 150 and fastening means 200 (as shown on FIG. 4). Additionally, two wheels are fitted together along with axle holding the wheels together. However, in the preferred embodiment, the toy vehicle 10 comprises of four (4) wheel assemblies 50 each independently fitted at four corners at the bottom surface of the toy vehicle without axle. The wheel 90 is inserted in the wheel cover 130 using a shaft 180.

Figure 3B:
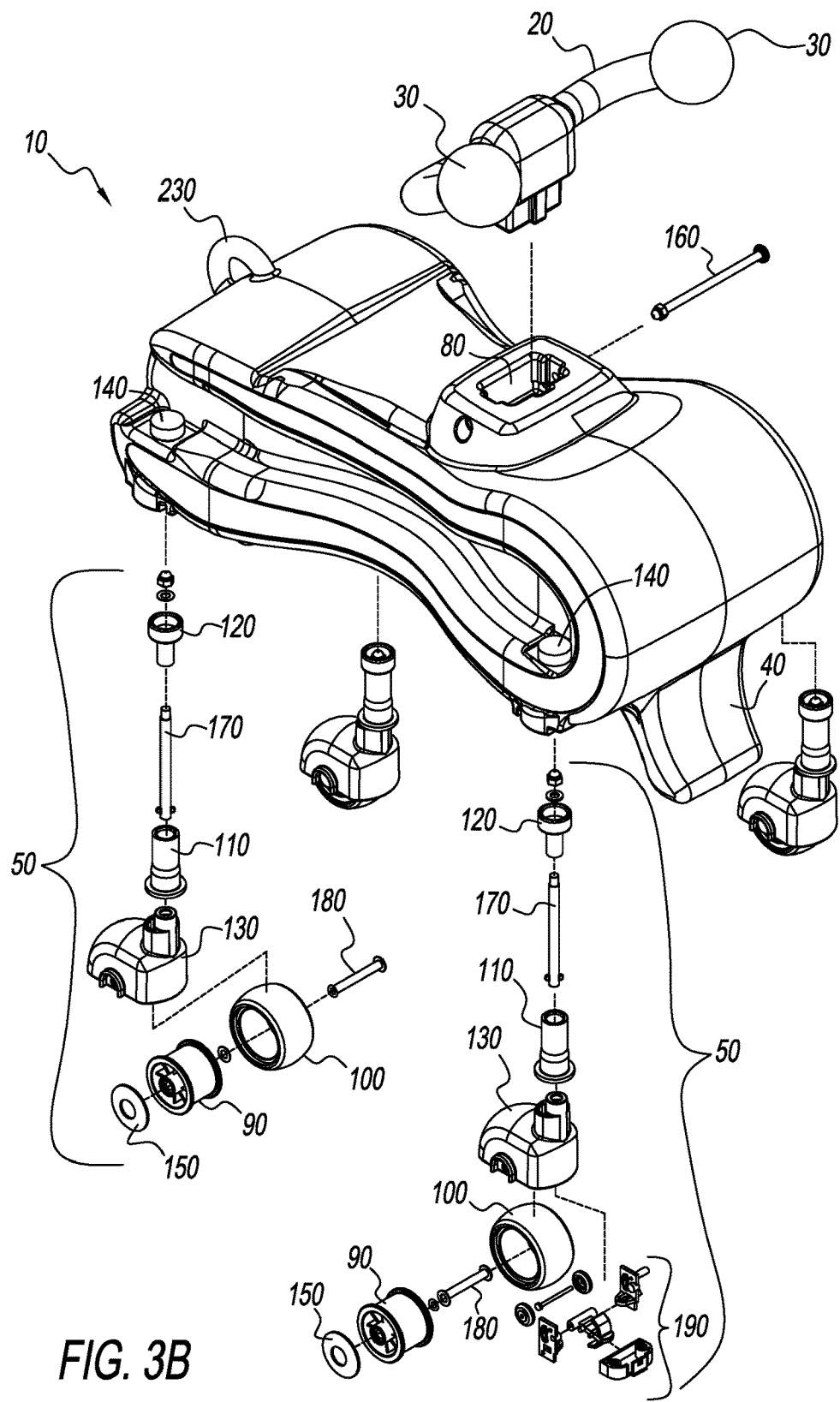
FIG. 3B is the exploded view of another embodiment of the toy vehicle.

FIG. 3B is another embodiment of the toy vehicle. The exploded view of the wheel assembly 50 includes a speed controlling means 190 (further explained in detail in FIG. 5 below). The speed controlling means, as explained above and below, are used to control the speed of the toy vehicle without deviating from the essence of the invention.

Figure 4:
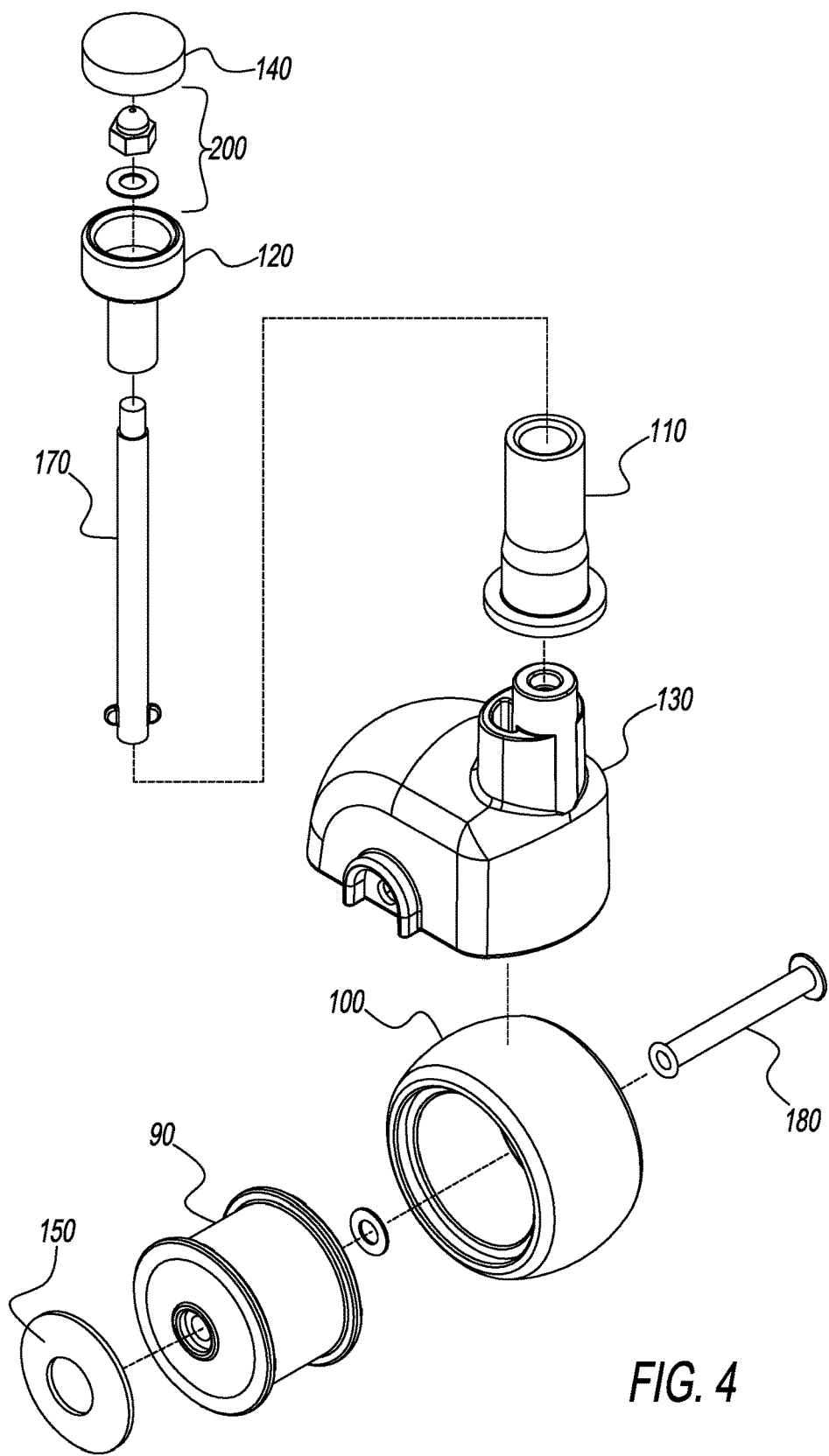
FIG. 4 is the exploded view of the wheel assembly of the preferred embodiment of the toy vehicle.

FIG. 4 is the exploded view of an of the independent wheel assembly 50. A disc 150 is fitted around the inner diameter on both sides of the wheel 90. This gives wheel added strength to the wheel and safety in case the child tries to insert his finger in the wheel. Generally, the disc is welded on the wheel but other means such as glue can also be used to insert the disc on the wheel. Once the wheel 90 is fitted with the core 100 and the disc 150, it is then inserted inside the wheel cover 130. The wheel cover is designed in such a way that it radially covers half of the wheel. A shaft 180 is used as an axle to hold the wheel 90 and wheel cover 130 together. The shaft 180 is generally made of steel or other galvanized metal. The shaft 180 is fitted with a nut bolt; a screw, a nail or other similar holding means to hold the wheel 90 and the wheel cover 130 together. The gap between the radiuses of the wheel 90 and the shaft 180 is such that the wheel can freely spin around the shaft 180 in a fly wheel movement. The weight of the wheel 90 and the core 100 also assist in achieving the fly wheel movement of the wheel 90. Additionally, the shape of the core 100 is pivotal in providing the fly movement to the wheel 90.

A shaft 170 is inserted on top of the wheel cover 130. This shaft 170 holds the bush 110 and bush 120 so that the wheel assembly can be independently inserted in the holes at the bottom surface of the toy vehicle 10. The shaft 170 is generally made of a stainless steel or other galvanized metal. The bush 110 and 120 are preferably made of plastic. However, a person of ordinary skill in the art can make the bushes by using other material. The bush 110 is received on top of the wheel cover 130 when the shaft 170 is inserted through the bush 110. The circumference of the lower end of the bush 110 is greater than the circumference of the portion of the wheel cover 130 that receives the bush 110. The circumference of the lower end of the bush 110 is such that it completely covers the portion of the wheel cover 130 that receives the bush 110. This shape helps each wheel assembly 50 to turn 360° independently when the toy vehicle 10 is being ridden. A bush 120 is inserted on top of bush 110. The circumference of the end of bush 120 inserted over bush 110 is smaller than the circumference of the end of bush 110 receiving the bush 120. The foregoing difference in circumference is provided so that bush 120 sits on top of bush 110. The circumferential gap between the shaft 170 and bush 110 and bush 120 is such that the whole wheel cover is freely rotated 360° around its own vertical axis. Each independent wheel assembly 50 is then inserted in the toy vehicle on each four corners as shown in FIG. 1. The wheel assembly 50 is held on the toy vehicle 10 by using a nut bolt 200. However, other fastening means can also be used. After the wheel assembly 50 is tightened by the nut bolt 200, the top is then preferably covered with cap 140.

Figure 5:
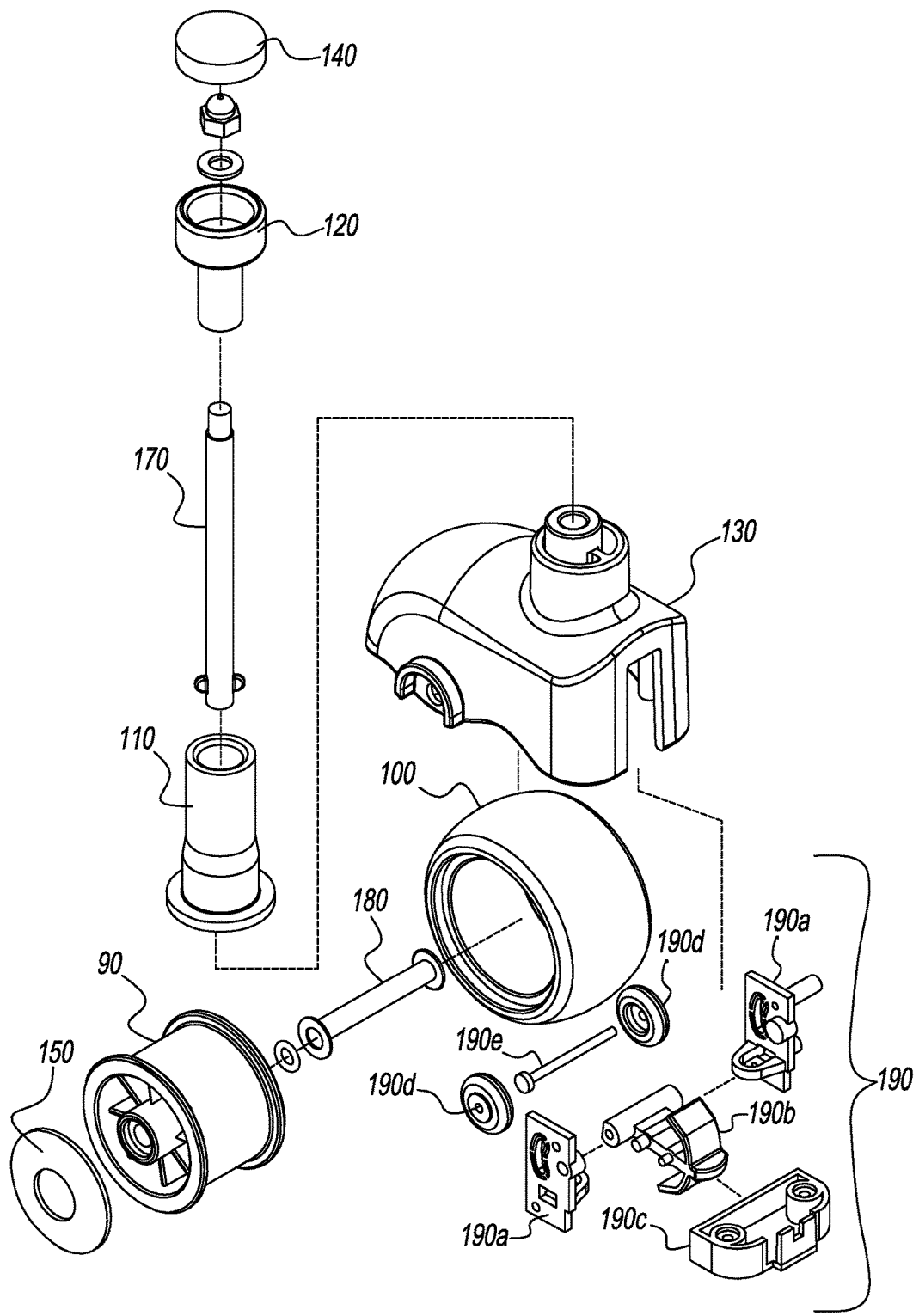
FIG. 5 is the exploded view of the wheel assembly of another embodiment of the toy vehicle.
Figure 6:
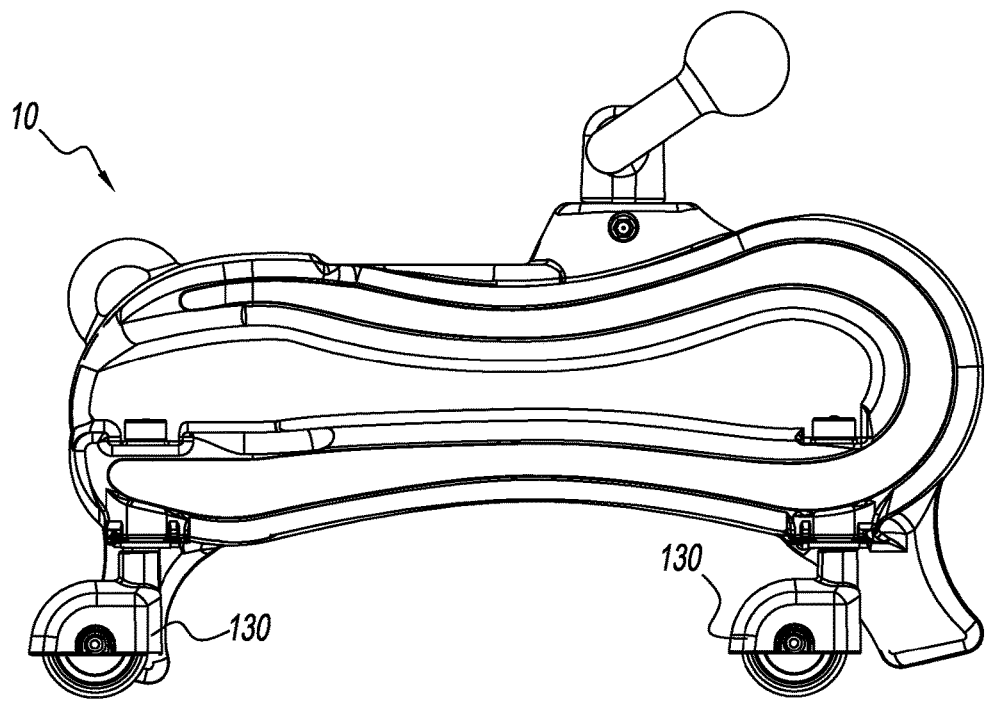
FIG. 6 is the side perspective view of the preferred embodiment of the toy vehicle.

In another embodiment, as shown in FIG. 5, the wheel assembly 50 is fitted with a speed controller 190 to control the speed of the toy vehicle 10. The means 190 to control the speed of the toy vehicle is fitted towards the back of the wheel cover 130. The means 190, to control speed of the toy vehicle, includes parts 190a to 190e that holds together the means 190 together. The means has two speed controls that limit the speed of the toy vehicle as set by the user. Part 190a are the side wall that holds a speed switch 190b in different positions. The speed controller 190 is attached with the wheel cover 130 using a base 190c. The speed switch 190b is moved in an upwards and downwards position to control the speed of the toy vehicle. This is achieved by attaching small wheels 190d with an axle 190e. When the speed switch is moved in any direction, the axle 190e is adjusted accordingly, which in turn push the wheels 190e against the core 100 to adjust the speed. Generally, the wheels 190e are made of the same material as core 100. The axle 190e is generally metal or galvanized metal such as stainless steel.

The wheel assembly is further stabilized by steel plates 220 that are attached at the bottom surface of the toy vehicle 10 as shown in FIG. 7. The Steel plate holds the Bush 110 at a 90° Degree angle. The steel plate 220 further supports the wheel assembly by providing extra strength in terms of load bearing capacity of the toy vehicle 10. The wheel assembly is designed in a manner to reduce friction for easy maneuverability.

Figure 8:
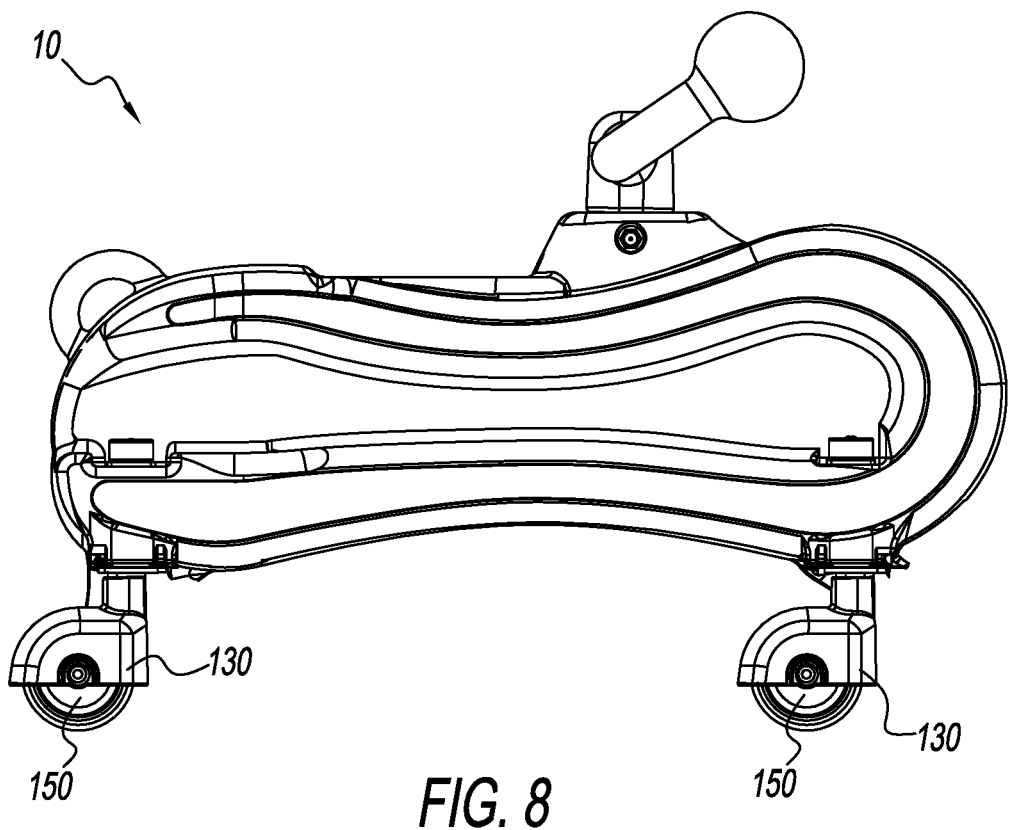
FIG. 8 is the side perspective view of another embodiment of the toy vehicle.
Figure 9:
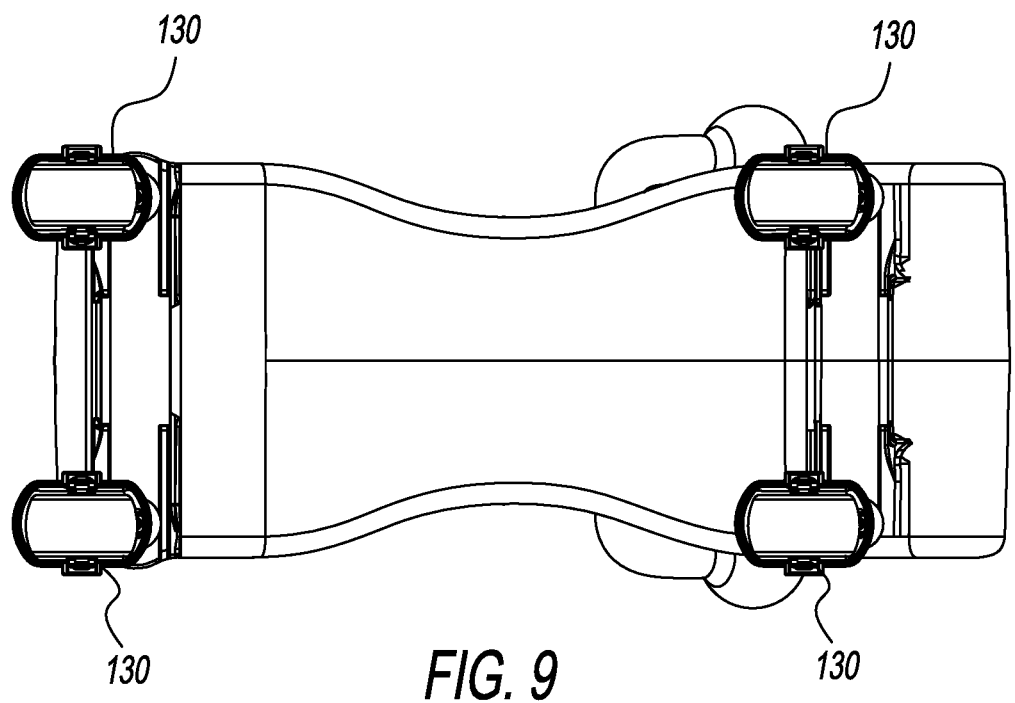
FIG. 9 is the top view of the bottom of another embodiment of the toy vehicle.
Figure 10:
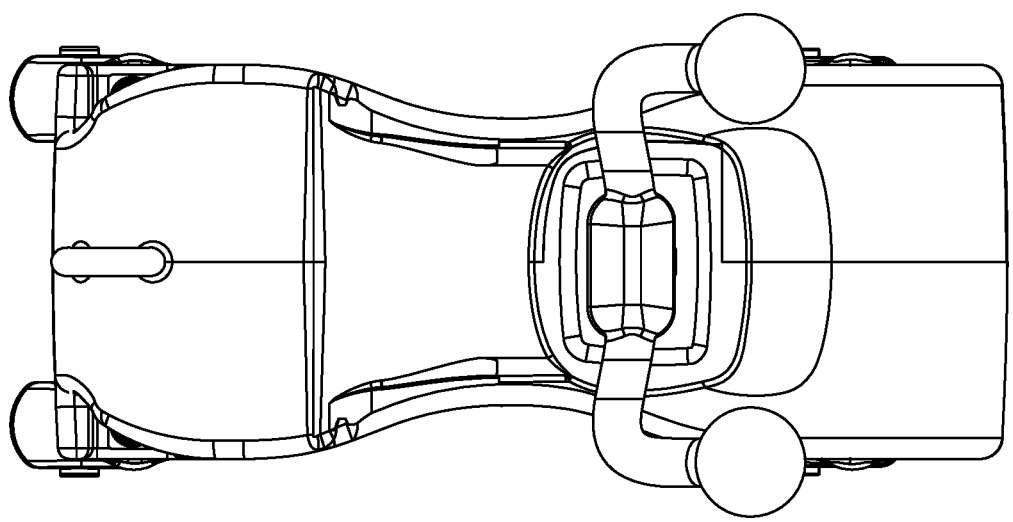
FIG. 10 is the top view of the toy vehicle.

FIG. 8 and FIG. 9 are a side perspective and top view of the bottom surface of the toy vehicle 10 respectively. In another embodiment as shown in FIGS. 8 and 9, the toy vehicle 10 does not have the front bumper 40 and the back bumper 210.

While preferred embodiments of the disclosure have been shown and described, modifications thereof can be made by one skilled in the art without departing from the spirit and teachings of the disclosure. The claims intend to cover all such modifications and changes by one skilled in the art. The embodiments described herein are exemplary only, and are not intended to be limiting. Many variations and modifications of the disclosure disclosed herein are possible and are within the scope of the disclosure. Where numerical ranges or limitations are expressly stated, such express ranges or limitations should be understood to include iterative ranges or limitations of like magnitude falling within the expressly stated ranges or limitations. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

What is claimed is:

1. A toy vehicle apparatus, comprising:
   a vehicle body, comprising:

an upper surface molded in a shape of a seat comprising a saddle having a laterally widened rear end portion and a narrow front end portion, the upper surface of the body configured to vertically receive a detachable handle projecting upwardly from the upper surface of the body when mounted in the upper surface of the body and configured to form a grip for a rider; and a bottom surface having four corners and defining a hole at each of the four corners of the bottom surface; and four wheel assemblies, each of the four wheel assemblies inserted in a respective one of the holes defined by the bottom surface at each of the four corners of the bottom surface, each of the four wheel assemblies comprising:

a rotatable wheel wholly covered by a core circumferentially;

two discs each covering a complete inner radius of the wheel of each side of the wheel;

a cover to receive the rotatable wheel while radially covering half of the wheel;

a bush assembly to receive the cover of the wheel;

the cover comprising of a member protruding upwardly from the cover, the member receiving an upper part of the bush assembly placed on upper portion of the wheel, the bush assembly including two mounts to enable the wheel assembly to be rotatably fitted in one of the holes at the four corners of the bottom surface of the toy vehicle;

a circumference of a first cylindrical end of a first mounting means having an identical circumference of the cover;

a second cylindrical end of the first mounting means circumferentially receiving the first cylindrical end of a second mounting means;

one second cylindrical end of the second mounting means being covered with a circular cap after the wheel assembly is received at corner of the bottom surface of the toy vehicle; and a means to independently fasten each wheel assembly on the four corners of the bottom surface.

2. A toy vehicle apparatus, comprising:

a vehicle body, comprising;

an upper surface of the body molded in a shape of a seat comprising a saddle having a laterally widened rear end portion and narrow front end portion, the upper surface of the body configured to vertically receive a detachable handle projecting upwardly from the upper surface of the body when mounted in the upper surface of the body, and configured to form a grip for a rider;

a bottom surface configured to protrude outwardly from the body at each horizontal end of the bottom surface to act as a safety bumper, and defining holes at each of four corners of the bottom surface;

four wheel assemblies, each wheel assembly inserted in one of the holes defined at the four corners at the bottom surface, each of the four wheel assemblies, comprising:

a rotatable wheel wholly covered by a core circumferentially;

two discs each covering a complete inner radius of the wheel of each side of the wheel;

a cover to receive the rotatable wheel while radially covering half of the wheel;

a bush assembly to receive the cover of the wheel, the cover comprising a member protruding upwardly from the cover, the member receiving an upper part of the bush assembly placed on upper portion of the wheel, the bush assembly including a first mounting assembly and a second mounting assembly each configured to enable the wheel assembly to be rotatably fitted in the holes at four corners of the bottom surface of the body;

a first cylindrical end of the first mounting assembly having a circumference substantially equal to a circumference of the cover;

a second cylindrical end of the first mounting assembly circumferentially receiving a first cylindrical end of the second mounting assembly;

one second cylindrical end of the second mounting assembly covered with a circular cap after the wheel assembly is received at corner of the bottom surface of the toy vehicle; and a plurality of fasteners configured to fasten each wheel assembly at four corners of the bottom surface.

3. The apparatus of claim 2, wherein the detachable handle comprises a portion shaped to form a sphere.

4. The apparatus of claim 2, wherein the detachable handle is tilted forward at an angle.

5. The apparatus of claim 2, wherein each wheel assembly rotates independently in a 360° angle.

6. The apparatus of claim 2, wherein the bottom surface is configured to receive a wheel assembly at four corners that are equidistant from a center of the bottom surface.

7. The apparatus of claim 2, wherein the core is embedded with a coated material to provide fly wheel movement.

8. The apparatus of claim 2, wherein the core covering the rotatable wheel is angled at a cross section of the core.

9. The apparatus of claim 2, comprising a first mounting means and a second mounting means, wherein the first mounting means and the second mounting means comprise plastic.

10. The apparatus of claim 2, comprising a first mounting means and a second mounting means, wherein the first mounting means and the second mounting means comprise metal.

11. The apparatus of claim 2, the fasteners each further comprising a fastening nut.

12. The apparatus of claim 2, the fasteners each further comprising a nail.

* * * * *